US009392476B2

(12) United States Patent
Kenington et al.

(10) Patent No.: US 9,392,476 B2
(45) Date of Patent: Jul. 12, 2016

(54) METHOD OF PROCESSING NETWORK CONFIGURATION DATA

(75) Inventors: Peter Kenington, Chepstow (GB); Nicholas James Randell, Alton (GB); John Holden, Reading (GB); Richard Edge, South Glamorgan (GB); Stefan Thiel, Newbury (GB)

(73) Assignee: Viavi Solutions UK Limited, Berkshire (GB)

( * ) Notice: Subject to any disclaimer, the term of this patent is extended or adjusted under 35 U.S.C. 154(b) by 284 days.

(21) Appl. No.: 13/489,155

(22) Filed: Jun. 5, 2012

(65) Prior Publication Data

US 2013/0324110 A1 Dec. 5, 2013

(51) Int. Cl.
*H04W 24/08* (2009.01)
*H04W 24/04* (2009.01)
*H04W 36/00* (2009.01)

(52) U.S. Cl.
CPC .............. *H04W 24/08* (2013.01); *H04W 24/04* (2013.01); *H04W 36/0083* (2013.01)

(58) Field of Classification Search
CPC ..... H04W 24/10; H04W 24/20; H04W 24/00; H04W 24/08; H04W 24/04; H04W 24/06; H04W 24/02; H04W 36/0083; H04W 36/0061; H04L 63/1425
USPC .......................................... 455/445–448, 423
See application file for complete search history.

(56) References Cited

U.S. PATENT DOCUMENTS

| | | | | |
|---|---|---|---|---|
| 2009/0135730 A1* | 5/2009 | Scott et al. | ..................... | 370/252 |
| 2011/0009135 A1* | 1/2011 | Roskowski et al. | ........... | 455/500 |
| 2012/0002563 A1 | 1/2012 | Flanagan | | |
| 2013/0122855 A1 | 5/2013 | Kenington et al. | | |

OTHER PUBLICATIONS

European Telecommunications Standards Institute, "Universal Mobile Telecommunications System (UMTS); Radio Resource Control (RRC); Protocol specification (3GPP TS 25.331 version 10.3.1 Release 10)", ETSI TS 125 331, V10.3.1, May 2011, 1879 pages.

* cited by examiner

*Primary Examiner* — Nam Huynh
(74) *Attorney, Agent, or Firm* — Harrity & Harrity, LLP

(57) ABSTRACT

A method and system for comparing network configuration data stored in a wireless communication network with parameters that depend on the physical configuration of the network is provided. Subscriber wireless communication devices operating in the network provide measurement data. From the measurement data, at least one first parameter is selected or derived, the first parameter depending on the physical configuration of the network. From network configuration data stored in the wireless communication network, at least one second parameter that corresponds to the at least one first parameter is selected. Any discrepancy between the values of the first and second parameters is then identified. Analysis of the discrepancies may reveal errors or omissions in the stored network configuration data, such as missing entries in the neighbors table for a cell site. Faults in the physical network may also be revealed.

29 Claims, 7 Drawing Sheets

METHOD OF PROCESSING NETWORK CONFIGURATION DATA

FIELD OF THE INVENTION

The invention relates to network configuration data, in a mobile communications system.

BACKGROUND OF THE INVENTION

Wireless communication systems, such as GSM and the 3$^{rd}$ Generation (3G) of mobile telephone standards and technology, are well known. An example of 3G standards and technology is the Universal Mobile Telecommunications System (UMTS™), developed by the 3$^{rd}$ Generation Partnership Project (3GPP™) (www.3gpp.org).

The 3$^{rd}$ and 4$^{th}$ generations of wireless communications, and in particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. 'Calls' may be data, video, or voice calls, or a combination of these. An increasing proportion of communications involve data rather than voice, and the term 'connection' may be used for both data and voice 'calls'.

Macro cells utilise high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennas, each of which serves one sector of the cell. Often a cellular wireless communication system is described as comprising two parts: the network; and the mobile communication units.

FIG. 1 provides a perspective view of one prior art wireless communication system 100. The system 100 of FIG. 1 comprises a network of base stations BS1-BS8. Only one mobile communication unit 110 is shown. In a real network, there may be anywhere from thousands to millions of mobile communication units.

A base station such as 120 communicates with mobile communication unit 110. Base station 120 allows mobile communication unit 110 to place calls through the network, and receive calls routed through the network to base station 120.

Base station 130 has been shown as having a coverage area 132. If base station 130 had an omnidirectional antenna, and the terrain was flat, then coverage area 132 might be circular. However, both the shape and extent of the coverage areas of a typical base station depend on many variables, and may change with time.

Controller 140 manages calls within the wireless communication system 100. Controller 140 would be linked to all the base stations BS1-BS8, but the links are not shown in order to keep FIG. 1 simple to interpret. Controller 140 may process and store call information from the base stations BS1-BS8, plus many other base stations not shown in FIG. 1. In a UMTS network, controller 140 may be linked to the base stations via one or more Radio Network Subsystems.

Radio networks produce data at a very high rate when controlling the operation of mobile devices. This data rapidly builds to provide a vast set of data. Some prior art systems make this set of data available for processing customer complaints. In a typical scenario, a customer will report that their mobile communication device is prone to one or more problems. These problems might be, for example, that the device suffers frequent dropped calls or only achieves low data rates. Such complaints can sometimes be resolved by manually searching through the data produced in the radio network. If this is successful, it may explain whether the mobile communication device is faulty, or whether there is a fault in network.

When there is neither a fault in the network nor in the subscriber's mobile communication device, the fault may be due to the real, physical network not corresponding to the stored map of the network held within the system itself. It may occasionally be possible to trace the problem to such a cause manually, although not all recorded faults will allow a definitive identification of such discrepancies.

When a fault is due to the real network not corresponding to the stored map of the network, the network's own 'network configuration data' does not match the actual set of components deployed in the real network, i.e. as the network was built or upgraded. The configuration data held by the communication network may typically originate from a sub-system called the 'Network Planning System'. The Network Planning System is a database that holds such information as base station locations and pointing angles of sector antennas. However, the real network may have been built at slight variance to the desired configuration set out in the Network Planning System. Other sources of variance might be, for example, an antenna being knocked out of alignment. Such variances may lead to the mobile communication device experiencing sub-optimal support from the real network.

Prior art arrangements typically allow data from the network to be loaded and analysed in order to identify possible problems. However, this requires users to load and analyse the data manually to deliberately look for a discrepancy or fault, once the user has been notified that such a fault or discrepancy exists.

U.S. patent application Ser. No. 13/144,128, with filing date of 12 Jul. 2011, is entitled 'Wireless Communication Network'. U.S. Ser. No. 13/144,128 provides a method of correcting network configuration data describing a wireless communication network. Both applications are hereby incorporated by reference in their entireties. For at least one wireless communication device communicating with at least two sectors of a wireless communication network, a probability density function is derived for a location of each wireless communication unit. The probability density function is derived from one or both of:

(i) measurement information from the wireless communication unit;

(ii) the network configuration data.

The probability density functions from multiple communications are combined to provide a combined function, which is analysed to derive a most likely value for a network parameter. This can lead to a corrected network parameter, which can in turn be incorporated into the stored network configuration data. The method may comprise calculating a confidence score for each probability density function incorporated in the combined function, and calculating the value of the combined function from the confidence scores. The analysis may comprise varying the network parameter until a maximum value for the combined function has been reached, and selecting the value of the network parameter that maximises the combined function as the most likely value for the network parameter.

Also known is a basic system of real time surveillance of a wireless communication system. This surveillance system relies on two features of wireless communication systems:

(i) The wireless communication device's 'active set'. The active set is the list of cells or sectors that provide sufficient signal strength for the wireless communication device to consider communicating through the cell/sector. The active set is therefore the list of cells/sectors whose signal strength the mobile communication device will monitor periodically. The mobile communication device will select one of the cells or sectors from the active set, when it wishes to initiate a connection, i.e. a voice or data call, or to hand-off an on-going connection.

(ii) The network configuration data comprises a 'neighbor cell list'. The neighbor cell list is a list of cells which are recorded in the network configuration data as being neighbors of any given cell.

In this surveillance system, a radio network controller (RNC) waits for a message from a mobile communication device, indicating that the mobile communication device has located a neighboring cell that appears to be strong enough to be added into the current 'active set' of the wireless communication device. The RNC then checks the neighbor cell list for the wireless communication system, to see if the neighbor cell list includes the neighboring cell identified by the mobile communication device. If it does, then the RNC allows the mobile communication device to add the neighboring cell to the mobile communication device's active set.

However, if the neighbor cell list does not show an entry corresponding to the neighbor cell detected by the mobile communication device, then the RNC can generate an alarm or message saying that there is a missing neighbor. This is a simple system, which assumes that each neighbor cell detected by any mobile communication device ought to be in the neighbor cell list held in the Network Configuration Data. This surveillance method therefore defaults to a conclusion that the neighbor cell list is in error. Another shortcoming of this approach rests in the fact that it involves waiting for certain messages that do not then result in changes to the radio configuration, e.g. the adding of another sector into the active set of the mobile communication device. Such passive waiting may mean that there has been an unrecognised problem in the network for some time, before any notification of the potential problem reaches the RNC. The unrecognised problem, for however long it lasts prior to identification and correction, will mean poorer service for users of the network and potentially extra demand in other parts of the network and poorer throughput data rates for the users.

Hence, there is a need for an improved method for verifying stored network configuration data in a wireless communications network with a cellular network, such as an LTE, GSM or UMTS network.

BRIEF DESCRIPTIONS OF DRAWINGS

Embodiments of the invention will be described, by way of example only, with reference to the accompanying drawings, in which.

DETAILED DESCRIPTION OF EMBODIMENTS OF THE INVENTION

Figure 1:
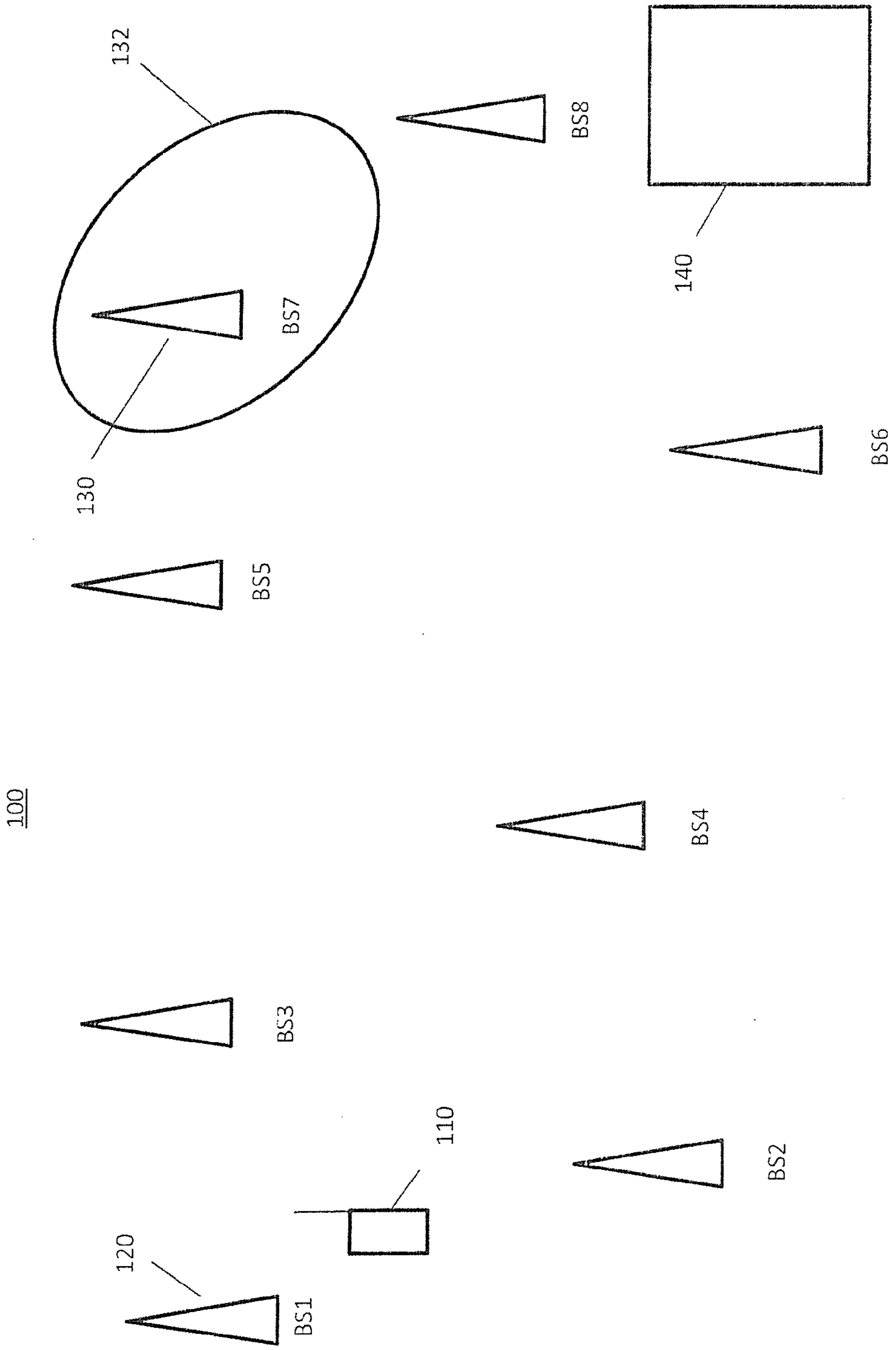
FIG. 1 is a schematic diagram, illustrating a prior art cellular wireless communication system.

A wireless communication network is provided, together with a method of comparing network configuration data stored in a wireless communication network with parameters that depend on the physical configuration of the wireless communication network.

The method of comparing stored network configuration data with parameters that depend on the physical configuration of the network comprises receiving measurement data from subscriber wireless communication devices operating in the network. At least one first parameter depending on the physical configuration of the network is derived or selected from the received measurement data. From network configuration data stored in the wireless communication network, at least one second parameter that corresponds to the at least one first parameter is selected. A discrepancy between a value of the at least one first parameter and a value of the at least one second parameter is then identified. The method allows verification that the stored network configuration data agrees with the real physical configuration of the wireless communications network. The method also comprises analysing an identified discrepancy.

The first and second parameters are such that their values would be expected to be the same, if the physical configuration of the wireless communication network corresponds to the stored network configuration data. If the value of the at least one first parameter corresponds to the value of the at least one second parameter within a predetermined range, the method may identify that the at least one second parameter accurately represents the real physical configuration of the wireless communication network.

The wireless communication network may, for example, operate in accordance with the GSM, UMTS or LTE standards. The wireless communication network comprises network nodes and mobile communication devices, as generally explained in connection with FIG. 1. Each network node supports communications with mobile communication devices in a cell. The network provides data that contains a rich source of information for the radio environment as seen by the mobile devices, including radio resources both used and observed throughout each call.

In its broadest sense, the invention employs processing and storing of radio network data that depends on the real, physical network, in order to allow problems with the operational configuration of the network to be identified and fixed, and/or errors or omissions in the network configuration data to be isolated. The invention may provide continual monitoring of the radio environment and lead to the early detection of problems, which may improve network performance and prevent customer complaints. The invention differs from known systems, in which processing and correlating data cannot be done continuously and are normally done manually as a result of a customer complaint. The present invention may provide the advantage of being able to fix problems before they have any discernible impacts on customer service.

The invention utilises measurement data extracted from the network, and a further input is derived from network configuration data. In addition, in some embodiments, the invention may also utilise separate location estimates for mobile communication devices. Using the measurement data from the network and the network configuration data, the invention may detect errors present in the network configuration data database held by the network. Alternatively, or in addition, the method may identify a portion of the real physical communication network that has not been built in accordance with a planned network configuration, or that is malfunctioning. An example of a malfunction may, for example, be a broken component, or an antenna knocked out of alignment. This differs from the situation where a portion of the real physical communication network has not been built in accordance with a planned network configuration, for example where the feeds to two sector antennas have inadvertently been swopped during assembly of a base station.

The network configuration data may be held in a database that is, for example, within the operation support system (OSS) of the network. Examples of the type of network configuration data within which errors can be detected, and for which corrections can be proposed back to the network or OSS, include:

a) Errors in the neighbors table, which stores details of all of the valid (accepted/allowable) neighbors of a cell site or sector.

b) Errors in the database of sector azimuth settings and/or sector elevation settings. The azimuth setting informs the network about the compass direction in which a given sector is pointing.

c) Errors in the site location itself. These are errors in the latitude and longitude values showing the precise geographic location of a cell site.

This list is purely illustrative. The invention may be configured to detect many other network information errors of a similar nature. However, the errors can be considered to arise in two particular ways. These two sources of error are shown in Table 1 below.

TABLE 1

Types of Error and Examples

| Type of error | Example of type of error |
|---|---|
| The network configuration data describes the network as it was planned, but the real, physical network differs in an undesirable way from the network configuration data. | (i) An antenna has been knocked, and no longer points in the optimum direction, or has been damaged.<br>(ii) The line feeds to two sector antennas have been swapped, so signals from the RNC that are destined for two sectors are each being fed to the wrong sector.<br>(iii) An antenna, such as that of a femtocell, has been installed in the wrong location. |
| The network configuration data has an omitted or incorrect entry, although the real network has been built correctly and is fault free. | (i) A femtocell has recently been added to the network, but there is no entry in the network configuration data for that femtocell.<br>(ii) The co-ordinates listed for a base station in the network configuration data are incorrect, although the base station has in fact been built exactly where it should be in the real, physical network. |

Figure 2:
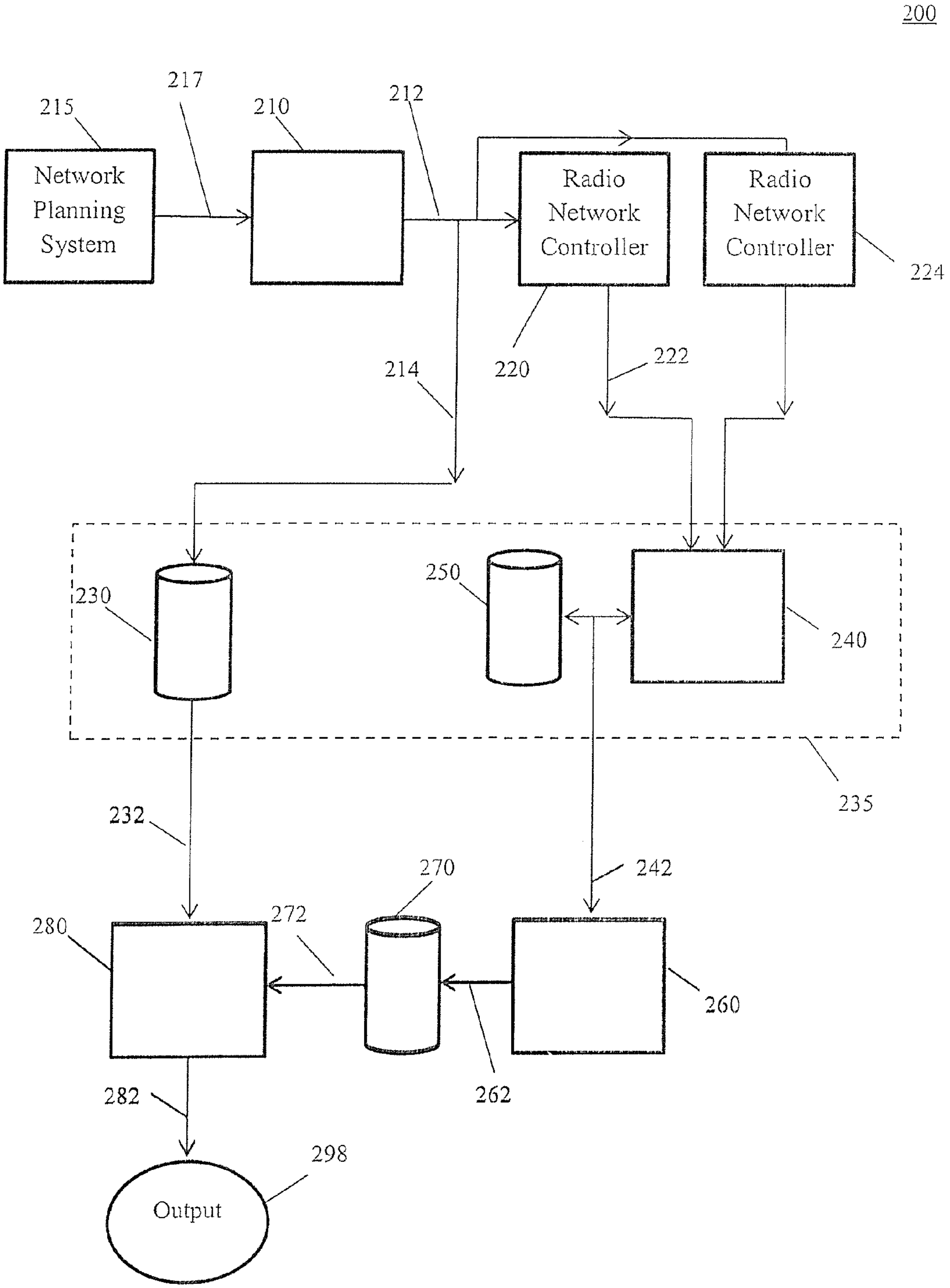
FIG. 2 is a schematic diagram, illustrating a cellular wireless communication system in accordance with an embodiment of the invention.

FIG. 2 shows the structure of a wireless communication system 200 in accordance with the present invention. In the explanation of FIG. 2 provided below, aspects of the operation of system 200 are also explained.

Management module 210 of a mobile communication system 200 may comprise the Operational Support System (OSS) of the network, or an equivalent functional unit. The exact design of management module 210 is specific to the type of communication system, such as a 3G, LTE, UMTS, GSM or other system.

Network Planning System 215 holds the network configuration data for the mobile communication system 200. Radio Network Controllers 220 and 224 each control a series of base stations, which are not shown in FIG. 2. Only two Radio Network Controllers 220 and 224 are shown on FIG. 2. However, there would typically be many more Radio Network Controllers in a system 200.

Each of management module 210, Network Planning System 215 and Radio Network Controllers 220 and 224 corresponds generally to elements of typical known mobile communication systems, such as mobile communication system 100 shown in FIG. 1.

Network Planning System 215 may provide, for example, a radio plan for the locations, azimuth pointing directions and sector elevations, allowable neighbors (for hand-over), and various other parameters. These parameters may be provided for the sectors and cell-sites within the radio network of mobile communication system 200, i.e. the sectors and cell-sites connected to Radio Network Controllers 220 and 224. This plan should have been physically implemented within the network of base stations, i.e. the plan shows the network as the network's designers wished it to be constructed. The implementation of the network may typically involve building base station sites, installing antennas, pointing antennas correctly, and other mechanical and electrical installation steps. Once this has been done, the relevant parts of the network configuration data will have been loaded from Network Planning System 215 into management module 210, e.g. the Operational Support System, as shown at 217. The planning information will be used by the mobile communication system 200 when determining handover decisions, and for other purposes internal to the operation of the network.

Management module 210 provides all or part of the network configuration data to the individual Radio Network Controllers 220 and 224, as shown at 212. The network configuration data, as the management module 210 believes it to be, is also available as an input data set to the components shown within dotted line 235 on FIG. 2, as shown at 214. The network configuration data held by the management module 210 may, of course, be incorrect. It may be incorrect either in that it does not reflect the reality of the systems and components that were actually selected and installed in the real physical network, or in that it does not reflect how various network elements such as base-stations and antennas were actually configured during installation. The invention allows the identification of errors in the network configuration data, based upon the measurement and/or analysis of parameters of the real, physical network from which specific elements of the network configuration data can be independently verified.

Such errors will be detected as discrepancies between at least one first parameter derived from measurement data from the real, physical network, and at least one corresponding second parameter selected from the stored network configuration data. Having identified these errors, there are various possibilities for resolving them. In one embodiment, the errors could be flagged up to the network operations team managing the network from the network operations centre or equivalent control location. This allows the development of a work plan to resolve the discrepancies. However, some errors may be such that the network configuration data can be immediately corrected, for example by automatically correcting data values within the information held directly within management module 210 or in network planning system 215. Some configuration errors in the real network can also be corrected remotely. An example would be where it is possible to electronically re-swop the data that is fed to two sectors, for which the feeds of the two sector antennas had been swopped accidently. This could have happened if they have been misconnected during construction of the real network. Thus by remotely, electronically, swapping the data fed to each sector, the effect of the erroneous antenna RF feed swap can be neutralised.

Eliminating discrepancies between the network configuration data and the real, physical network will often lead to fewer dropped calls within the network. Such dropped calls arise due to attempts to hand over to a neighboring sector or cell that is not actually present in the physical network, is not functioning correctly, or is in a different location from that expected by the network. A better quality of service may also be provided to the user. For example, a higher data rate may be achieved by correcting antenna azimuth errors. Such errors may arise due to a real, physical antenna mis-alignment, such as if the antenna pointing direction has been skewed as a result of high winds or as a result of mechanical failure of the mounting bracket.

The components shown within dotted line 235 may generally have the functionality of the 'GEO™' system provided by Arieso™. These components can therefore also provide geolocation data for mobile communication devices, based on measurement data from the RNCs 220, 224. However, the components shown within dotted line 235 of FIG. 2 also contribute to the operation of a system for identifying discrepancies between stored network configuration data and the real wireless communication network, in accordance with the invention. First store 230 acts as a 'configuration information' store. First store 230 is provided with network configuration data from management module 210, as shown at 214. The network configuration data may comprise some or all of (i) Site locations; (ii) Sector azimuths and/or elevations; and (iii) Cell neighbors. However, in an alternative embodiment not shown in FIG. 2, the network configuration data may be obtained from the individual Radio Network Controllers 220 and 224 themselves, as an alternative to obtaining it from management module 210.

Radio Network Controllers 220 and 224 provide measurement information that originates from the real, physical wireless communications network, as shown for example at 222 from Radio Network Controller 220. The types of information provided by the Radio Network Controllers 220 and 224 may comprise:

(i) Raw measurement reports that a mobile communication has sent. These report on the experienced radio environment, e.g. received signal power and interference levels, neighboring cells that the mobile communication device can detect (i.e. 'see'), and the associated signal strengths of neighboring cells.

(ii) Control messages sent between various different elements of the mobile network.

(iii) Internal messages providing additional information on the operation of the network.

Where Radio Network Controller 220 provides a raw measurement report, the measurement data may comprise measurements mandated to be provided by subscriber wireless communication devices operating in accordance with the communications standard applicable to the wireless communication devices and/or the network. This data would be obtained by the subscriber wireless communication device and supplied to the network during routine operation of the subscriber wireless communication device. The measurements may be obtained in accordance with the 3GPP Specification TS25.331 for radio resource control. However, the measurement data may comprise measurements obtained by a dedicated application running on at least one subscriber wireless communication device. Such a dedicated application obtains, and transmits to the network, at least one measurement that is not mandated to be provided by subscriber wireless communication devices operating in accordance with the communications standard applicable to the wireless communication devices and/or the network. This dedicated application may be deployed on a proportion of the subscriber wireless communication devices, and hence may be introduced to existing systems without requiring replacement of all the subscriber wireless communication devices.

First processor 240 acts as a 'parser', by extracting the relevant/useful information from the very large volume of information provided by the Radio Network Controllers 220 and 224. Pending US patent application, with application Ser. No. 13/293,558, filed on 10 Nov. 2011 and entitled 'Geolocation data acquisition system', explains more details of the parsing function, and is hereby incorporated by reference in its entirety. The information extracted by first processor 240 is stored in second store 250, which may be a database or hard disk, for example.

Relevant call segments derived from the user calls within the physical network are then periodically extracted from second store 250. These call segments are fed to a second processor 260, as shown at 242.

Second processor 260 acts as an 'error processor', which analyses this information and determines if there is a potential problem. An example of a problem might be, for example, related to the list of neighbor cells held in the network configuration data. In this example, a mobile communication device in the real network may detect the presence of a neighboring cell with a high received signal strength. That information would be included as part of a raw measurement report from the mobile communication device. However, the discrepancy involves the neighboring cell either not being recognised by the Radio Network Controller 220 as a neighbor, or not being a permitted hand-off candidate, when its high signal strength indicates that it probably should be. At this stage, only a 'potential error' has been identified.

In general, second processor 260 may operate in one of two ways. It may select an existing parameter, from among the parameters that are included in the measurement data from the mobile subscribers. However, second processor 260 may derive a new parameter that was not directly reported in the measurement data from the mobile subscribers. This 'first parameter' may either be one selected from the measurement data, or one derived from that data.

Potential problems are stored in third store 270, which acts as an 'error store'. Third store 270 may be, for example, a database or a hard disk. Potential problems held in third store 270 are thus available for further analysis.

The further analysis is carried out by a third processor 280, which functions as an 'analysis engine'. Third processor 280 has two inputs. The first is from the first store 230 and provides relevant network configuration data. The relevant network configuration data is taken from the management module 210, such as an OSS, or may be taken from RNC 220 and/or 224. This input, shown at 232, is what the network itself 'believes' its configuration to be. The second input to third processor 280, shown at 272, is from the third store 270 of 'potential errors'.

Third processor 280 compares the information obtained from inputs 232 and 272, or information derived from those inputs. The precise form of this comparison will vary depending upon the network configuration parameter in question. However, it will typically be able to answer the question: does the network-derived configuration equal the network's stored configuration in each case? If not, i.e. if the potential error recorded in store 270 is shown to be a true error, then this is flagged. Such errors form one possible output ('result') from the system, as shown at 298.

The system of FIG. 2 may be scalable. In one implementation, system 200 may be able to detect errors in many different parameters. In such a case, first store 230 would hold at least site location information, sector azimuths and/or elevations, and cell neighbor data, all supplied from the network configuration data. However, system 200 may be scaled back, and designed specifically to detect errors in one particular parameter. Such a specialised system 200 is discussed below with reference to an example where the parameter of interest is the set of neighbors for each cell in the communication system.

Missing Neighbor Detection System and Method

In the specific case of a system for identifying 'missing neighbors', the system 200 would be tailored to look at the neighbors table of the network configuration data. The 'errors' or discrepancies identified by system 200 in this case are those of seemingly valid neighbors, which are missing or wrongly identified in the 'neighbors table' of the network configuration data. This may be the 'neighbors table' of the Operational Support System or management module 210. The information supplied by first store 230 at 232 in this embodiment is 'neighbor configuration' information. In this embodiment, therefore, first store 230 may hold only cell neighbor data, in contrast to the site location information, sector azimuths/elevations and cell neighbor data that store 230 holds in the more general implementation of system 200.

Second processor 260 acts as a 'missing neighbors processor', in that it is specifically focussed on identifying segments of call data from second store 250 that are useful for identifying missing neighbors. Thus third store 270 becomes a store of 'potential missing neighbor errors'. The information supplied at 272 would be 'potential missing neighbors' information.

In this embodiment, third processor 280 still functions as an analysis engine. However, at 282, the output would be information about neighbors missing from the network configuration list held in the management module 210 as a 'neighbors table', or held in each of Radio Network Controllers 220 and 224.

In operation, measurements received at 222 from the radio network are processed in first processor 240 to work out if they indicate a strong sector being measured. If they do not result in a new sector being added to the active set within a reasonable time period, a potentially missing sector ('neighbor') is identified by second processor 260 acting as a 'missing neighbors processor'. The potential missing sectors/neighbors are then added to third store 270, which acts as the store of potential missing neighbors. The information in third store 270 is stored for analysis later. Further analysis in third processor 280 takes place against the missing sectors. This analysis includes cross checking against the active neighbor list to identify if there really is a missing sector, or possibly (alternatively) a problem with the radio environment in the real wireless communication network.

A system 200 directed to detecting missing neighbors may provide one or more advantages, in comparison to the more general implementation of system 200. For example, the system may operate more quickly, and/or may be less complex.

Figure 3:
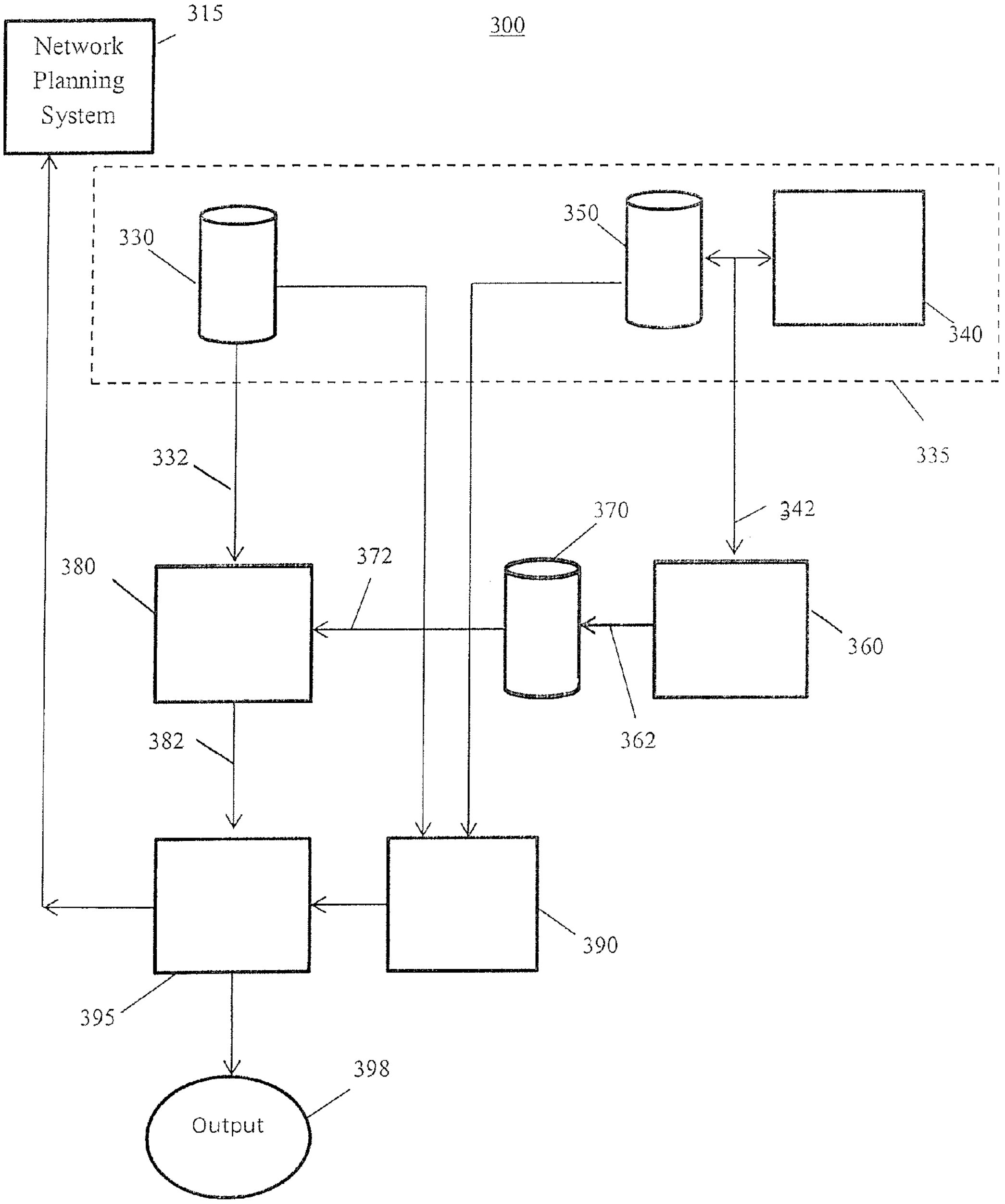
FIG. 3 is a schematic diagram, illustrating an alternative cellular wireless communication system in accordance with an embodiment of the invention.

The system 200 of FIG. 2 may be further developed, as generally shown in FIG. 3. System 300 of FIG. 3, compared to FIG. 2, provides a second check, as a further refinement. FIG. 3 is explained using the example of the neighbors list as the parameter of interest. However, other parameters could be analysed using the checking system and shown in FIG. 3.

FIG. 3 shows the following elements that correspond to the similarly numbered elements in FIG. 2: network planning system 315; first store 330; second store 350; first processor 340; second processor 360, third store 370 and third processor 380. These elements receive data from elements corresponding to the Radio Network Controllers 220 and 224 and processor 210 of FIG. 2, although those elements have not been repeated in FIG. 3.

The check implemented by the system 300 of FIG. 3 takes the form of using the measurement data derived from the mobile communication devices in the relevant part of the network. This measurement data is used to calculate what network configuration data would be expected, for example which neighbors should be present in the neighbors table. The result of this calculation is then compared with the errors that were identified by third processor 380 acting as an 'analysis engine', to see if there is agreement between the two methods of calculation. If so, then there is a very strong indication that a part of the network configuration data, for example the neighbors table, is indeed incorrect.

In FIG. 3, fourth processor 390 is provided. Fourth processor 390 receives network configuration data from first store 330. Fourth processor 390 also receives call segment data from second store 350. Using these two inputs, fourth processor 390 calculates a 'network-derived configuration' based on at least a subset of the measurement data from the real, physical network. This network derived configuration may be, for example, the list of neighbors that would be expected to be in the neighbors list for each cell, based on at least the subset of the measurement data from the real, physical network supplied by second store 350.

Fifth processor 395 receives the network-derived configuration, for example the list of neighbors that would be expected for each cell, from fourth processor 390. Fifth processor 395 also receives the list of likely errors from third processor 380, with third processor 380 functioning as explained in connection with FIG. 2 for third processor 280. With these two inputs, fifth processor 395 can check for agreement between the two methods of calculation of discrepancies/errors. Fifth processor 395 is in effect identifying a discrepancy between the stored network configuration data and a network-derived configuration that accords with the potential error.

When applied to the problem of missing neighbors, the embodiment of FIG. 3 builds on the neighbor analysis of FIG. 2, by providing an additional step of calculating what the neighbor list should be. This approach takes the observed measurements from the real, physical network and works out how many times different neighbors are seen and their relative strength. This provides an updated neighbor table, i.e. a neighbor table derived directly from measurements of signals observed in the real, physical network. The following example illustrates this approach: Assume that a mobile communication device records simultaneous observations of Cell A and Cell B 10 times, with a high RSCP (Signal Strength) on each occasion. However, the mobile communication device records simultaneous observations of Cell A and Cell C only once, and then only with a low signal strength. In this case, the neighbor list would have A and B as high priority neighbors, but would have A and C as low priority neighbors. As more and more cell pairs are seen, the A&C combination may well stay at the bottom of the list, for this network-derived configuration data.

System 300 calculates a theoretical neighbor list, using the analysis from first store 330 and that from second store 350. This provides a list of missing neighbors as the output from fourth processor 390. If this 'theoretical' neighbor list shows one of the identified missing neighbors with a high enough priority, then this is a double check that the missing neighbor identified by third processor 380 really should be added to the neighbors table held in the network configuration data.

Detailed Embodiment with Geolocation and Missing Neighbor Detection

It is instructive to consider one possible detailed method implemented by the embodiment of FIG. 3, in which geolocation data is used, and which enables missing neighbor detection. The processing may start with first processor 340, which functions as a parser. First processor 340 writes out a file containing call segments, based on measurement data received from the real, physical network, such as RNCs 220 and 224. A first copy of this file is passed to the second processor 360, which acts as a 'missing neighbors' engine.

As mentioned earlier, the components shown within dotted line 335 may generally have the functionality of the 'GEO™' system provided by Arieso™. This functionality may comprise providing geolocation estimates for mobile communication devices, based on measurement data from RNCs 220, 224. The components within dotted line 335 derive the location data from measurements made in the network, rather than the stored network configuration data or separate estimates such as from GPS. This geolocation data can be added to a second copy of the file from first processor 340, for calls that the file contains. The second copy of the file is then loaded into second store 350.

Second processor 360 then analyses the call segments, searching for missing neighbors. Those neighbors identified as missing are then stored in third store 370, which acts as a missing neighbor store. Third store 370 then holds a set of data for analysis, with two kinds of analysis being run. The analyses may be run later, rather than in real time.

Third processor 380 will use the network configuration data from first store 330 and entries stored in the 'missing neighbors' third store 370, to produce a report showing those neighbors that are probably missing. We can consider this as a first analysis. Third processor 380 provides the results of the first analysis to fifth processor 395.

The second analysis is that carried out by fourth processor 390 to provide the neighbor list derived from the measurements obtained from the real network. The result of this is a more optimized neighbor list. Fourth processor 390 provides the results of the second analysis to fifth processor 395.

Fifth processor 395 can then cross check the results of the first and second analyses, to see if the missing neighbors from the first analysis match new entries in the optimized neighbor list from the second analysis. Finding a missing neighbor from the first analysis in the optimized neighbor list from the second analysis is a very strong sign that the neighbor should be added to the network configuration data.

As can be seen from FIGS. 2 and 3, the invention provides a system for verifying stored network configuration data and/or verifying the construction of a wireless communication network in accordance with a planned network configuration. First processor 240, 340 is operable to receive measurement data from subscriber wireless communication devices operating in the wireless communications network, the received measurement data depending on a physical configuration of the wireless communications network. First processor 240, 340 is also operable, from the received measurement data, to derive or select at least one first parameter of the wireless communication network that depends on the physical configuration of the wireless communication network. Third processor 280, 380 is operable, from network configuration data stored in the wireless communication network, to select at least one second parameter that corresponds to the at least one first parameter. Third processor 280, 380 is operable to identify a discrepancy between a value of the at least one first parameter, and a value of the at least one second parameter. Fifth processor 395 of FIG. 3 may then confirm the cause of the discrepancy. The elements within regions 235 or 335 may provide a geolocation network operable to provide independent geographic location data for the subscriber communication devices.

Details of Methods Implemented By the Invention

The system shown in FIGS. 2 and 3, and described above, enables the identification of discrepancies between the network configuration data and the actual configuration of the real physical network. These discrepancies may be due to either or both of the error types shown in Table 1 above. Some detailed method steps that may be implemented by the systems of FIGS. 2 and 3 are now described.

Figure 4:
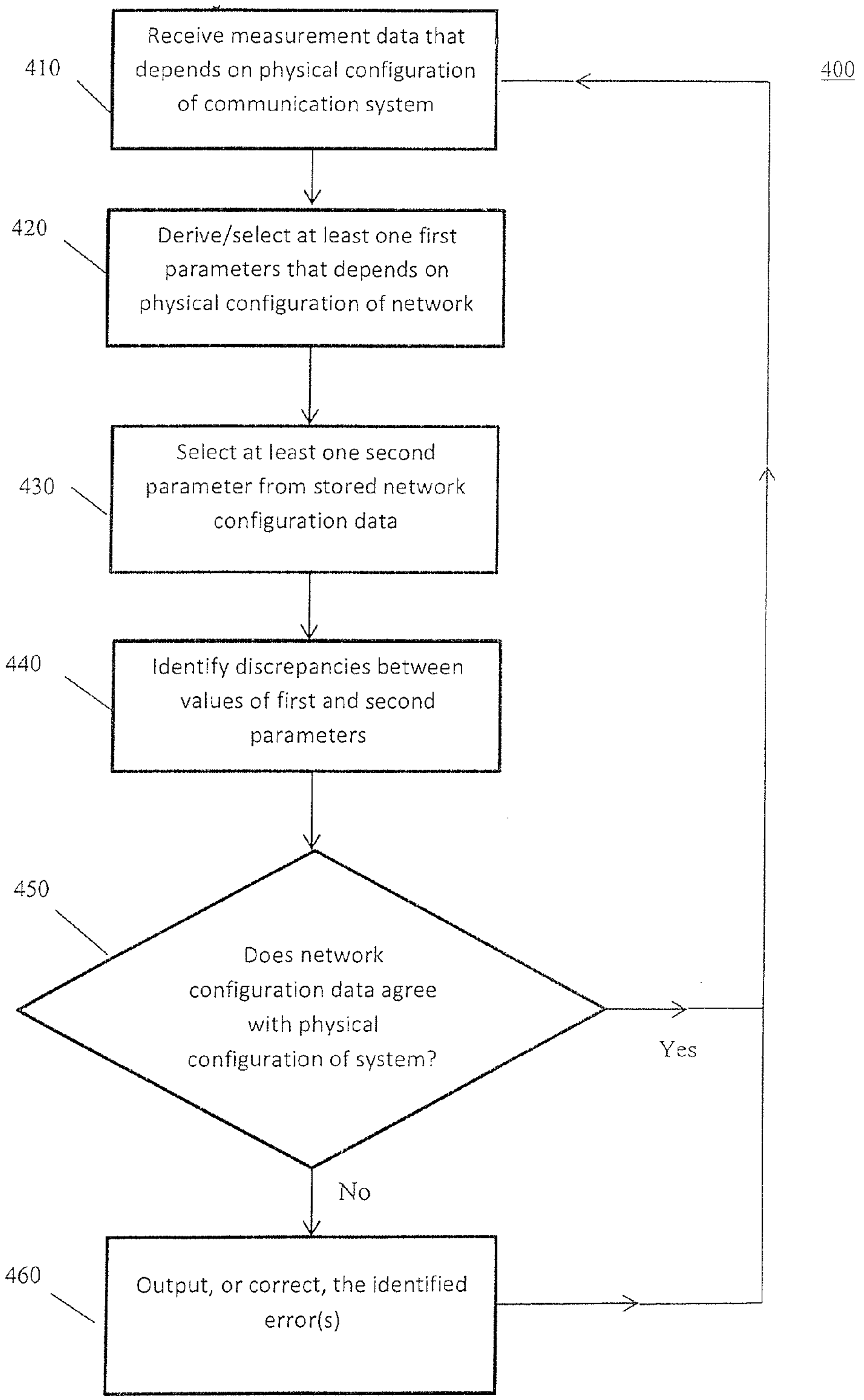
FIG. 4 illustrates a method in accordance with embodiments of the invention.

Flowchart 400 of FIG. 4 illustrates a method for identifying various potential errors, for example both kinds of errors shown in Table 1.

At 410, measurement data is received from subscriber wireless communication devices operating in the wireless communications network. The received measurement data depends on a real, physical configuration of the wireless communications network, for example the actual location and specification of the system as it is at the time point when the data is measured.

At 420, from the received measurement data, at least one first parameter of the wireless communication network that depends on specific elements in the network configuration data is derived or selected. So the first parameters derived from the measurement data are suitable for comparison with the network configuration data, and that comparison may reveal discrepancies between the measurement data and the network configuration data.

At 430, at least one second parameter is selected from network configuration data stored in the wireless communication network, the at least one second parameter corresponding to the at least one first parameter.

At 440, any discrepancies are identified between a value of the at least one first parameter, and a value of the at least one second parameter.

At 450, a decision is made whether the network configuration data agrees with the physical configuration of the system, thereby verifying that the stored network configuration data is in accordance with the real, physical configuration of the wireless communications network. This decision may be based on an analysis of the discrepancies identified at 440. If the answer is yes, then the method returns to 410. If the answer at decision 450 is no, then the method passes to 460.

At 460, the potential error is either output for action, corrected by remotely re-configuring the network, or is corrected in the network configuration data. From step 460, the method returns to 410.

Where parameters are selected from the measurement information that originated from the real, physical wireless communications network, step 420 may further comprise extracting a subset of data from measurements made for all calls across the wireless communications network. From the subset of data, a potential error is identified, and stored in third store 370. The analysis of the selected parameters may further comprise third processor 380 comparing a potential error from third store 370 to a corresponding portion of the network configuration data, and identifying discrepancies between the network configuration data and a network-derived configuration that would accord with the potential error from third store 370.

A selected parameter may comprise a received signal strength measurement above a threshold, from a sector of the network, the sector not being in an active set for the wireless communication device that provided the received signal strength measurement. In this case, a potential error is identified by second processor 260, 360 for the sector, if the sector is not added to an active set in the wireless communication device within a predetermined time period. Once such a potential error has been detected, third processor 280, 380 may cross check the potential error against the active neighbor list of the network configuration data. Third processor 280, 380 may thereby determine whether the sector is missing from the active neighbor list in the network configuration data. If the sector is missing from the active neighbor list, then it potentially should be added to the list, i.e. there is an error in the network configuration data held in the communication system. In this case, the problem is one of incomplete information in the network configuration data. However, if the sector is not missing from the active neighbor list in the network configuration data, the error may be classified as a potential problem with the radio environment in the network.

The method of the invention may operate with a variety of measurement information that is provided from the real, physical wireless communications network. The received measurement data may comprise measurement reports from subscriber wireless communication devices operating in the wireless mobile communications network, each measurement report comprising data about the radio environment experienced by a subscriber wireless communication device. A measurement report may comprise at least one of the following group, for a subscriber wireless communication device: a received signal power; an interference level; one or more detectable neighboring cells; and signal strengths of the one or more detectable neighboring cells. In addition or alternatively, the received measurement data may comprise one or more of: control messages sent within the wireless communications network; and internal messages providing additional information on the operation of the wireless communications network.

The method may comprise a selected parameter being a received signal strength measurement from a sector of the network. A potential error may then be identified for the sector, when the received signal strength measurement does not correspond with an expected received signal strength measurement for the sector. When this occurs, a cross check may be made against a sector azimuth setting and/or a sector elevation setting in the network configuration data, to determine whether the sector azimuth setting and/or the sector elevation setting in the network configuration data is incorrect. Where a sector elevation is incorrect, the cause may be sector swaps in a vertical sectorisation base-station system. Alternatively, it could simply be that an adaptive antenna system (AAS) or remote electrical tilt (RET) system has incorrectly interpreted the elevation settings sent to it, or has failed in some way.

The method may comprise a selected parameter being a received signal strength measurement from a sector of the network. A potential error may then be identified for the sector, when the received signal strength measurement does not correspond with an expected received signal strength measurement for the sector. When this occurs, a cross check may be made against a site location entry in the network configuration data, to determine whether the site location in the network configuration data is incorrect.

Figure 5:
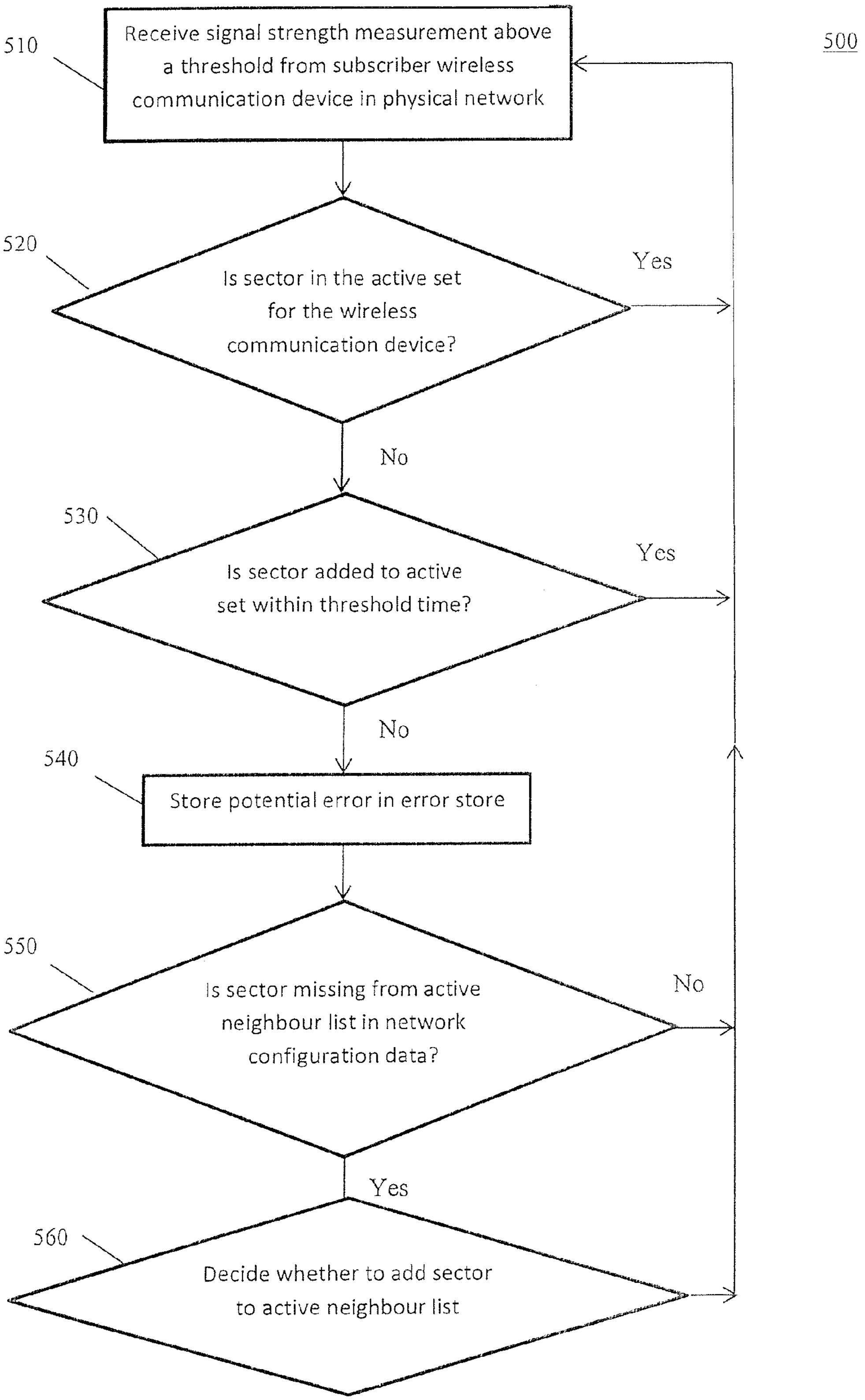
FIG. 5 illustrates a method for identifying potential 'missing neighbor' errors.

Flowchart 500 of FIG. 5 illustrates an embodiment in which the method may be particularly tailored to detecting errors in the neighbor list held as part of the network configuration data.

At 510, measurement data is received. The data comprises a signal strength measurement received by a subscriber communication device in the physical network, the signal strength being above a threshold.

At 520, if the sector is in the subscriber wireless communication device's active set, then the method returns to 510. If not, then the method progresses to 530.

At 530, if the sector is added to the subscriber wireless communication device's active set within a time threshold, then the method returns to 510, If not, then the method progresses to 540.

At 540, the potential error is added to the third store 270, 370.

At 550, a decision is made about whether the sector is missing from the active neighbor list in the network configuration data. If it is present, then the method returns to 510. If the sector is missing, then the method progresses to decision 560. At 560, a decision is made whether or not to add the sector to the active neighbor list of the network configuration data, after further analysis, and then the method returns to 510.

Application to Azimuth and Elevation Errors

The network configuration data may comprise information about the azimuth and elevation of sector antennas in the wireless communication system. However, the information held as part of the network configuration data about the azimuth and elevation may differ from the correct values in the real, physical network. In addition or instead, an antenna may have been knocked or been subject to a failure, such as failure of a mounting bracket.

In the specific case of an 'azimuth error', the system 200 of FIG. 2 and/or system 300 of FIG. 3 may be tailored to look at the database of azimuth pointing directions and/or elevation settings, in the network configuration data.

The 'errors' or discrepancies identified might be those of seemingly nonsensical azimuth directions. Such nonsensical directions might arise, for example, if cable connections have been wrongly made on a mast. In such a case, one sector's antenna could have been connected to a neighboring sector's base-station electronics, and vice-versa. This would lead to an azimuth error of 120 degrees in a typical 3-sector base-station site. In this case, the comparison is between the likely geographic coverage of a sector, given its the pointing direction reported from the OSS and the location of the users actually served by the site. If these two pieces of information don't coincide to a reasonable degree, for a given sector, then there is likely to be an error in the azimuth pointing directions database. If a sector's antenna has been connected to a neighboring sector's base-station electronics, then the mobile communication devices actually served by the electronics may be in an area located 120 degrees away from where the network configuration data would predict them to be, in the case of a tri-sector base-station configuration.

When the system 200 (or 300) is tailored to look for 'azimuth errors' or 'elevation errors', second store 250 holds call information provided by first processor 240 acting as a parser. However, third store 270 will provide a store of geolocations.

Third store 270 then supplies information about potential sectors with azimuth or elevation errors to third processor 280. First store 230 holds at least information about sector azimuths, derived from the network configuration data. First store 230 supplies the sector azimuth or elevation information to third processor 280. The output 298 then comprises a list of corrections to the azimuth or elevation data values of the network configuration data.

Table 2 summarises and contrasts the three embodiments explained above in relation to FIG. 2. Each of the embodiments may be enhanced by the additional check shown in FIG. 3.

TABLE 2

Signals and Functions of The System of FIGS. 2 and 3 Indifferent Embodiments

| Role of each component: | Embodiment: Correction of multiple aspects of network configuration data | Embodiment: Correction of neighbors tables | Embodiment: Correction of azimuth and/or elevation setting data |
|---|---|---|---|
| First store 230, 330 | Stores: Site locations; Sector Azimuths; Cell neighbors | Stores at least Cell neighbors | Stores at least Sector Azimuths and/or elevation settings for sector antennas |
| Second store 250, 350 | Stores call segments | Stores call segments | Stores call segments |
| Second processor 260, 270 | Functions as general error processor | Functions as 'missing neighbors' processor | Functions as generator of location data for each call or call segment |
| Third store 270, 370 | Store of network errors for selected network configuration parameter(s) | Store of potential missing neighbors | Store of geolocations |
| Supplied at 232, 332 | Network configuration information | Neighbors from network configuration data | Sector azimuths and or elevation settings from network configuration data |
| Supplied at 272, 372 | Potential errors in selected network configuration parameter(s) | Potential missing neighbors | Potential sectors with azimuth or elevation errors |
| Third processor 280, 380 | Detects network configuration or radio environment errors for selected network configuration parameter(s) | Outputs identity of neighbor cells/sectors that are missing from network configuration data | Provides a table of sectors with azimuth or elevation errors, or configuration/functional faults in real network. |

Example of Operation in a UMTS Network

Figure 6:
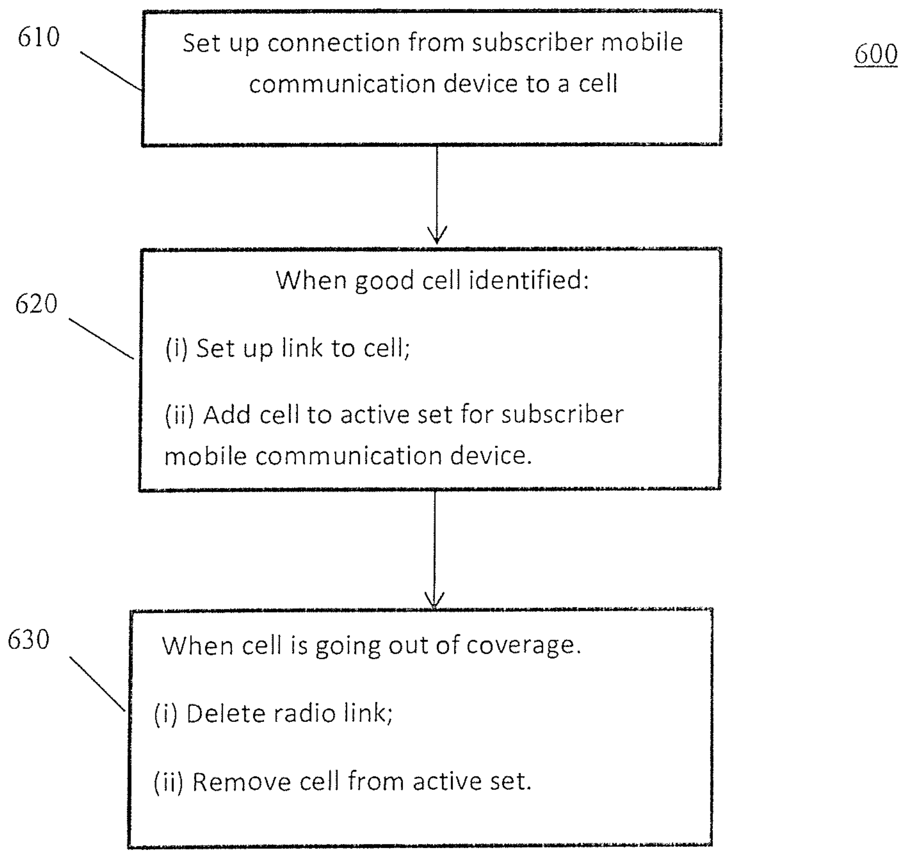
FIG. 6 illustrates the operation of a UMTS communications network.

Typically, a UMTS mobile network operates as illustrated by flowchart 600 of FIG. 6.

At 610, a connection is created between a subscriber mobile communication device and a single cell. The network tells the subscriber mobile communication device to provide measurement reports to the network, when certain thresholds of signal to noise are crossed.

At 620, when the network receives a measurement report from the subscriber mobile communication device for a new good cell from the subscriber mobile communication device, the network makes a decision to create a radio link to that cell and add the cell to the active set for the subscriber mobile communication device.

At 630, when the network receives a measurement report from the subscriber mobile communication device for a cell going out of coverage, the network makes a decision to remove the cell from the active set, and delete the radio link.

The actions described at 620 and 630 are repeated, whilst the connection is in progress. At 620, the subscriber mobile communication device is free to report any cells that it sees, However, the Radio Network Controller (RNC) of known UMTS networks will only add a new cell to the subscriber mobile communication device's active set if that new cell is in the neighbor list of the network configuration data. Such a constraint is not universal, in all mobile communication systems, but is a constraint in UMTS.

Figure 7:
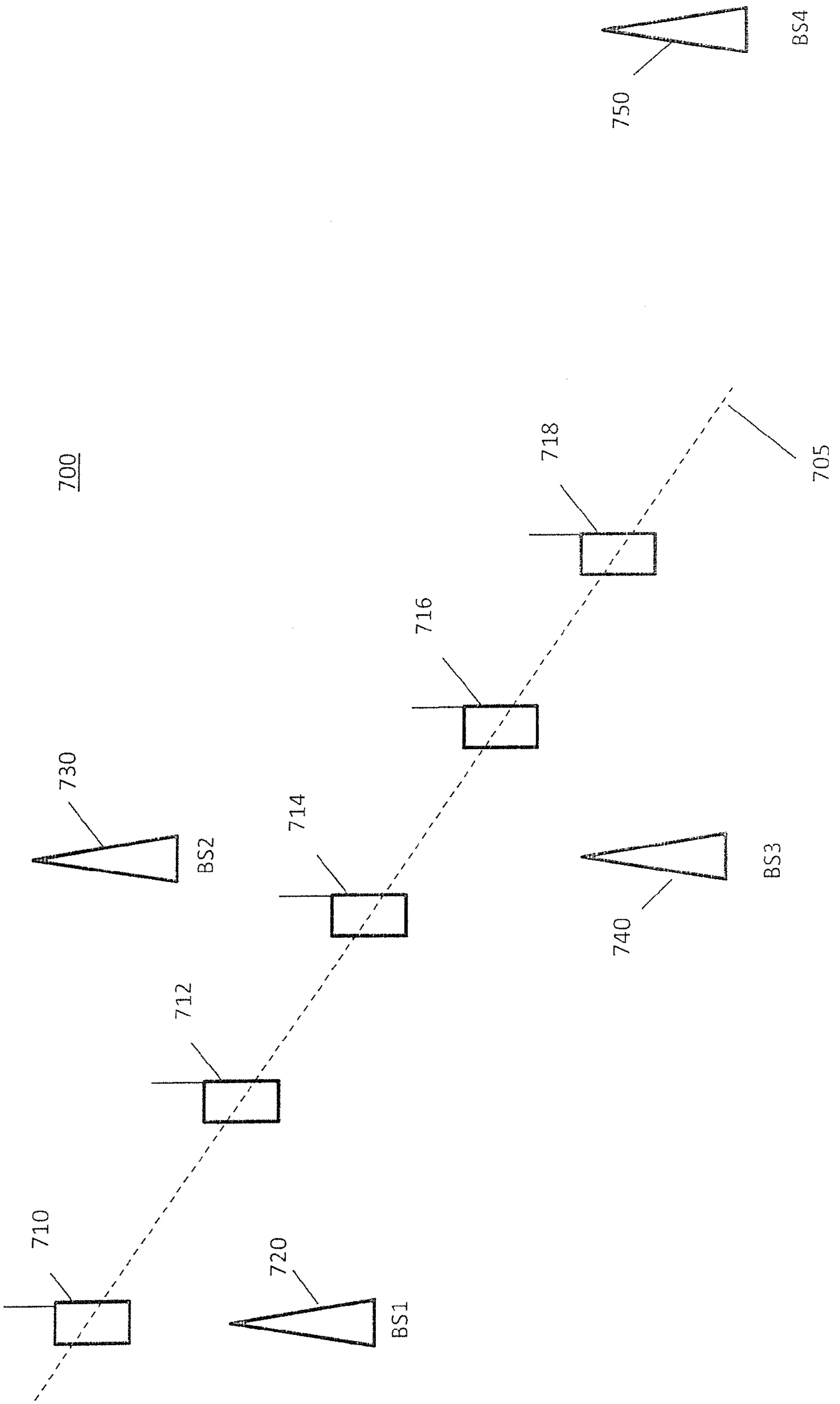
FIG. 7 illustrates the movement of a mobile communication device through a mobile communications network at different time points.

The consequences for a UMTS network can be understood from FIG. 7. As explained below, with known UMTS systems, if a strong cell detected by a mobile communication device is not in the neighbor list, it will never be added to the active set.

FIG. 7 shows a mobile communication system 700. Mobile communication system 700 comprises bases stations at BS1 at 720, BS2 at 730, BS3 at 740 and BS4 at 750, although many other base stations may be present. Each of the base stations 720, 730, 740 and 750 shown on FIG. 7 is intended to be indicative of a cell of the mobile communication system 700, so may instead be a sector antenna of a cell, for example.

Reference 705 indicates the path of a mobile communication device through the mobile communication system 700. At successively later time points, the mobile communication device takes up positions indicated as 710, 712, 714, 716 and 718. However, the mobile communication device shown at each of locations 710, 712, 714, 716 and 718 is the same mobile communication device. Path 705 need not be straight.

The centre column of Table 3 below shows the base stations that can be detected by the mobile communication device at positions 710, 712, 714, 716 and 718. The right column shows the cells that would appear on the mobile communication device's active set, with a prior art UMTS system.

TABLE 3

Cells Observed At Locations Shown In FIG. 7

| Location of mobile communication device | Cells observed by mobile communication device | Active set of mobile communication device |
|---|---|---|
| 710 | BS1 | BS1 |
| 712 | BS1, BS2 | BS1, BS2 |

TABLE 3-continued

Cells Observed At Locations Shown In FIG. 7

| Location of mobile communication device | Cells observed by mobile communication device | Active set of mobile communication device |
|---|---|---|
| 714 | BS1, BS2, BS3 | BS1, BS2 |
| 716 | BS2, BS3 | BS2 |
| 718 | BS3 | None - call is dropped |

At location 710, only the signal from BS1 720 is sufficiently strong to be above the mobile communication device's measurement threshold. At position 712, BS2 730 is also strong enough. At position 714, all of BS1 720, BS2, 730 and BS3 740 provide sufficiently strong signals. However, at position 714, BS3 would not added to the list of active sites, i.e. the mobile communication device's active set, with prior art UMTS systems. This would arise, typically, because BS3 had been erroneously omitted from the neighbors table in the network configuration data of wireless communication system 700.

The consequence for the mobile communication device at locations 716 and 718 is clear. At location 716, BS1 now no longer provides a sufficiently strong signal to be included in the list of observed cells, so drops out of the active set. Only BS2 is in the active set. At location 718, BS2 now no longer provides a sufficiently strong signal to be included in the list of observed cells, so also drops out of the active set. At location 718, therefore, the active set is empty and the connection is lost.

BS4 is too distant to be observed by the mobile communication device at location 718. However, had BS3 been able to support a connection to the mobile communication device at location 718, the mobile communication device might have been able to maintain the connection through BS3 until BS4 was in range.

The methods of the invention will detect that BS3 was on the list of cells observed and reported by the mobile communication device at all of locations 714, 716 and 718, but not on the active set. See step 520 in FIG. 5. As shown in step 530, the method may detect that the sector was not added to the active set within a time threshold. This finding leads to the flagging up of a potential error, see step 540 in FIG. 5, followed by appropriate action, see steps 550 and 560. At step 560, in the above example, base station BS3 may be added to the neighbor table of the network configuration data. Prior art UMTS networks would not do this. With the invention, future mobile communication devices following tracks such as 705 in FIG. 7 would add BS3 to their active set, when they detected a sufficiently strong signal such as at locations 714, 716 and 718.

So the method of FIG. 4 or 5 may involve looking at the measurement reports that identify a new cell. Within a short time period, a verification can be made that the cell has been added to the active set. If it has not been added, then that fact is stored for future processing and resolution.

In summary, the methods of the invention may allow some or all of: (i) The use of a mobile communication device's measurements and network measurement parameters, to predict the likely actual configuration of a network. (ii) The comparison of these predictions with the actual stored network configuration, in order to identify errors in this stored configuration. (iii) The correction of identified errors in the stored database of network configuration data, either automatically or via a human check/verification.

Some or all of the following steps may be used with the method of the invention: (i) The use of all or part of the measurement reports coming from the Radio Network Controllers; (ii) The measurement of the time period between measurements being observed and marking the neighbors as missing. (iii) Correlation with the network configuration data to identify real errors.

Advantages resulting from the invention may include: (i) Re-use, with modification, of components of the Arieso™ GEO™ system, which may process all the data from the Radio Network Controllers, all the time. (ii) More than just missing neighbors can be detected. (iii) Storage of historical data can be used to verify that a change has worked.

The invention may be implemented in any 3G network, and also in 2G or 4G networks, with appropriate adaptation of the measurement analysis algorithm.

The inventive concept herein described may be implemented within cellular communication networks adapted in accordance with various alternative wireless communication technologies and standards. Furthermore, the inventive concept may be implemented in a wide variety of signal processing circuits. It is further envisaged that, for example, a semiconductor manufacturer may employ the inventive concept in a design of a stand-alone device, such as a microcontroller, digital signal processor, or application-specific integrated circuit (ASIC) and/or any other sub-network element.

A computer-readable storage device may be provided, the storage device having stored executable program code for programming signal processing logic to perform the method of the invention. The computer-readable storage device may comprise at least one of: a hard disk, a CD-ROM, an optical storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

It will be appreciated that, for clarity purposes, the above description has described embodiments of the invention with reference to different functional units and processors. However, it will be apparent that any suitable distribution of functionality between different functional units or processors may be used. For example, functionality illustrated to be performed by the separate processors of FIGS. 2 and 3 may be performed by other processors or controllers. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different dependent claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method comprising:

receiving, by a device, measurement data from subscriber wireless communication devices operating in a wireless communication network;

deriving or selecting, by the device and from the measurement data, at least one first parameter that depends on a physical configuration of the wireless communication network;

selecting, by the device and from network configuration data associated with the wireless communication network, at least one second parameter that corresponds to the at least one first parameter;

identifying, by the device, a discrepancy between a value of the at least one first parameter and a value of the at least one second parameter;

determining, by the device and based on the identified discrepancy, a correction to be made to at least one of a layout or an operation of the wireless communication network; and modifying, by the device and based on determining the correction, a data feed to a sector antenna of a cell site in the wireless communication network to correct an error in a connection of the data feed at the cell site.

2. The method of claim 1, further comprising:

identifying, when the value of the at least one first parameter corresponds to the value of the at least one second parameter within a predetermined range, that the at least one second parameter accurately represents the physical configuration of the wireless communication network.

3. The method of claim 1, where the measurement data comprises measurements:

mandated to be provided by the subscriber wireless communication devices operating in accordance with a communications standard applicable to at least one of the subscriber wireless communication devices or the wireless communication network; and obtained by the subscriber wireless communication devices and supplied to the wireless communication network during routine operation of the subscriber wireless communication devices.

4. The method of claim 3, where the measurements are obtained in accordance with the 3GPP Specification TS25.331 for radio resource control.

5. The method of claim 1, where the measurement data from at least one subscriber wireless communication device, of the subscriber wireless communication devices, comprises measurements obtained by a dedicated application running on the at least one subscriber wireless communication device, the dedicated application obtaining and transmitting, to the wireless communication network, at least one measurement, of the measurements, not mandated to be provided by the subscriber wireless communication devices operating in accordance with a communications standard applicable to at least one of the subscriber wireless communication devices or the wireless communication network.

6. The method of claim 1, further comprising:

analyzing the identified discrepancy by:

recognizing entries in the network configuration data that have incorrect values by:

identifying one or more of the at least one second parameter that is both at variance with a first parameter, of the at least one first parameter, and has an unrealistic value; or identifying, when a first parameter, of the at least one first parameter, has a repeatable value if derived or selected more than once from different measurement data, at least one second parameter that is at variance with the first parameter.

7. The method of claim 1, further comprising:

analyzing the identified discrepancy by:

identifying, from a first parameter of the at least one first parameter, features of the physical configuration of the wireless communication network that are not represented in the network configuration data; and deriving additional data entries for inclusion into the network configuration data from the first parameter, the additional data entries describing features of the physical configuration of the wireless communication network that are not represented in the network configuration data.

8. The method of claim 1, further comprising:

analyzing the identified discrepancy by:

identifying a first parameter, of the at least one first parameter, that indicates suboptimal performance of the subscriber wireless communication devices in a portion of the wireless communication network; and using the identified first parameter to identify a suboptimal physical configuration of the wireless communication network.

9. The method of claim 1, further comprising:

identifying, using the value of the at least one first parameter, a portion of the wireless communication network that has not been built in accordance with a planned network configuration, where the network configuration data is derived from the planned network configuration.

10. The method of claim 1, further comprising:

identifying, using the value of the at least one first parameter, a damaged or faulty component in the wireless communication network.

11. The method of claim 1, further comprising:

receiving independent geographic location data for the subscriber wireless communication devices from a geolocation system; and at least one of:

identifying the discrepancy based on processing the independent geographic location data, or analyzing the identified discrepancy based on processing the independent geographic location data.

12. The method of claim 1, where
selecting the at least one first parameter further comprises:
extracting a subset of data from measurement data resulting from calls across the wireless communication network; and
identifying the discrepancy between the value of the at least one first parameter and the value of the at least one second parameter comprises:
identifying a potential error based on the subset of the data; and
storing the potential error in an error store.

13. The method of claim 12, further comprising: analyzing the identified discrepancy by:
comparing the potential error to a portion of the network configuration data corresponding to the subset of the data; and
identifying, based on comparing the potential error to the portion of the network configuration data corresponding to the subset of the data, a discrepancy between the network configuration data and a network-derived configuration.

14. The method of claim 1, further comprising:
associating the identified discrepancy as a potential issue with the wireless communication network; and
classifying the potential issue as a potential problem with a radio environment in the wireless communication network,
the potential problem leading to suboptimal performance of the subscriber wireless communication devices in the wireless communication network.

15. The method of claim 1, where
at least one of the at least one first parameter or the at least one second parameter comprises a received signal strength measurement from a sector,
identifying the discrepancy comprises:
identifying a potential error for the sector when the received signal strength measurement does not correspond to an expected received signal strength measurement for the sector, and
the method further includes:
analyzing the identified discrepancy by:
cross checking against at least one of a sector azimuth setting or a sector elevation setting in the network configuration data to determine:
whether the at least one of the sector azimuth setting or the sector elevation setting in the network configuration data is incorrect, or
whether an antenna in the wireless communication network is misaligned.

16. The method of claim 1, where
at least one of the at least one first parameter or the at least one second parameter comprises a received signal strength measurement from a sector,
identifying the discrepancy comprises:
identifying a potential error for the sector when the received signal strength measurement does not correspond to an expected received signal strength measurement for the sector, and
the method further includes:
analyzing the identified discrepancy by:
cross checking against a site location entry in the network configuration data to determine:
whether the site location entry in the network configuration data is incorrect, or
whether a site, associated with the site location entry, has been constructed at an incorrect location.

17. The method of claim 1, where
the measurement data comprises measurement reports from the subscriber wireless communication devices,
each measurement report, of the measurement reports, comprising data about a radio environment experienced by a subscriber wireless communication device of the subscriber wireless communication devices.

18. The method of claim 17, where a measurement report, of the measurement reports, comprises at least one of:
information regarding a received signal power,
information regarding an interference level, or
information regarding one or more detectable neighboring cells.

19. The method of claim 1, where the measurement data comprises one or more of:
control messages sent within the wireless communication network; or
internal messages within the wireless communication network,
the internal messages providing additional information regarding an operation of the wireless communication network.

20. The method of claim 1, further comprising:
analyzing the identified discrepancy; and
providing, for presentation, results from analyzing the identified discrepancy to an end user in a network operations centre of the wireless communication network.

21. The method of claim 1, further comprising:
analyzing the identified discrepancy based on an active neighbor list of the network configuration data;
determining, based on analyzing the identified discrepancy, if information identifying a sector of the wireless communication network is included in the active neighbor list; and
selectively
adding, when the information identifying the sector is not included in the active neighbor list, the information identifying the sector to the active neighbor list; or
associating, when the information identifying the sector is included in the active neighbor list, the identified discrepancy as a potential issue with the wireless communication network.

22. A system comprising:
one or more processors to:
receive measurement data from subscriber wireless communication devices operating in a wireless communication network,
the received measurement data depending on a physical configuration of the wireless communication network;
derive or select, from the received measurement data, at least one first parameter of the wireless communication network that depends on a physical configuration of the wireless communication network;
select, from network configuration data associated with the wireless communication network, at least one second parameter that corresponds to the at least one first parameter;
identify a discrepancy between a value of the at least one first parameter and a value of the at least one second parameter;
determine, based on the identified discrepancy, a correction to be made to at least one of a layout or an operation of the wireless communication network; and modify, based on determining the correction, a data feed to a sector antenna of a cell site in the wireless communication network to correct an error in a connection of the data feed at the cell site.

23. The system of claim 22, where the one or more processors are further to:

analyze the identified discrepancy, and the one or more processors, when analyzing the identified discrepancy are to:

verify that at least one of:

the network configuration data is in accordance with the physical configuration of the wireless communication network, a layout of the wireless communication network is in accordance with a planned network configuration, or components of the wireless communication network are functioning correctly.

24. The system of claim 22, where the one or more processors are further to:

provide independent geographic location data for the subscriber wireless communication devices.

25. The system of claim 22, where the one or more processors are further to:

analyze the identified discrepancy based on an active neighbor list of the network configuration data;

determine, based on analyzing the identified discrepancy, if information identifying a sector of the wireless communication network is included in the active neighbor list; and selectively add, when the information identifying the sector is not included in the active neighbor list, the information identifying the sector to the active neighbor list; or associate, when the information identifying the sector is included in the active neighbor list, the identified discrepancy as a potential issue with the wireless communication network.

26. A non-transitory computer readable medium storing instructions, the instructions comprising:

one or more instructions which, when executed by a processor, cause the processor to:

receive measurement data from subscriber wireless communication devices operating in a wireless communication network, the received measurement data depending on a physical configuration of the wireless communication network;

derive or select, from the received measurement data, at least one first parameter of the wireless communication network that depends on a physical configuration of the wireless communication network;

select, from network configuration data associated with the wireless communication network, at least one second parameter that corresponds to the at least one first parameter;

identify a discrepancy between a value of the at least one first parameter and a value of the at least one second parameter;

determine, based on the identified discrepancy, a correction to be made to at least one of a layout or an operation of the wireless communication network; and modify, based on determining the correction, a data feed to a sector antenna of a cell site in the wireless communication network to correct an error in a connection of the data feed at the cell site.

27. The non-transitory computer readable medium of claim 26, where the instructions further include:

one or more instructions to analyze the identified discrepancy, and the one or more instructions to analyze the identified discrepancy include:

one or more instructions to verify that at least one of:

the network configuration data is in accordance with the physical configuration of the wireless communication network, a layout of the wireless communication network is in accordance with a planned network configuration, or components of the wireless communication network are functioning correctly.

28. The non-transitory computer readable medium of claim 26, where the instructions further include:

one or more instructions to provide independent geographic location data for the sub scriber wireless communication devices.

29. The non-transitory computer readable medium of claim 26, where the instructions further include:

one or more instructions to analyze the identified discrepancy based on an active neighbor list of the network configuration data;

one or more instructions to determine, based on analyzing the identified discrepancy, if information identifying a sector of the wireless communication network is included in the active neighbor list; and one or more instructions to selectively add, when the information identifying the sector is not included in the active neighbor list, the information identifying the sector to the active neighbor list; or associate, when the information identifying the sector is included in the active neighbor list, the identified discrepancy as a potential issue with the wireless communication network.

* * * * *